United States Patent [19]
McCormack et al.

[11] Patent Number: 6,085,292
[45] Date of Patent: Jul. 4, 2000

[54] APPARATUS AND METHOD FOR PROVIDING NON-BLOCKING PIPELINED CACHE

[75] Inventors: Joel J. McCormack, Boulder, Colo.; Kenneth W. Correll, Lancaster, Mass.; Barton W. Berkowitz, Framingham, Mass.; Christopher C. Gianos, Sterling, Mass.

[73] Assignee: Digital Equipment Corporation, Houston, Tex.

[21] Appl. No.: 08/870,152

[22] Filed: Jun. 5, 1997

[51] Int. Cl.[7] .................................................. G06F 12/08
[52] U.S. Cl. .......................... 711/140; 711/141; 711/145; 711/118; 711/169; 711/144
[58] Field of Search ................................. 711/140, 118, 711/154, 158, 169, 155, 141, 145, 146, 144

[56] References Cited

U.S. PATENT DOCUMENTS

| | | | |
|---|---|---|---|
| 5,526,510 | 6/1996 | Akkary et al. ........................ | 395/460 |
| 5,544,342 | 8/1996 | Dean ..................................... | 711/119 |
| 5,555,391 | 9/1996 | Subijana et al. ...................... | 711/113 |
| 5,555,392 | 9/1996 | Chaput et al. ........................ | 711/118 |
| 5,559,987 | 9/1996 | Foley et al. .......................... | 711/144 |
| 5,671,444 | 9/1997 | Akkary et al. ....................... | 395/872 |
| 5,752,069 | 5/1998 | Roberts et al. ................. | 395/800.23 |
| 5,790,130 | 8/1998 | Gannett ................................ | 345/430 |
| 5,826,109 | 10/1998 | Abramson et al. .................. | 710/39 |
| 5,829,029 | 10/1998 | Shelly et al. ........................ | 711/133 |

*Primary Examiner*—John W. Cabeca
*Assistant Examiner*—Pierre-Michel Bataille
*Attorney, Agent, or Firm*—Cesari and McKenna. L.L.P.

[57] ABSTRACT

A cache includes an address cache for storing memory addresses. An address queue is connected to the address cache for storing missed addresses in the order that the address cache is probed. A memory controller receives the missed addresses from the address queue. A data queue receives data stored at the missed addresses from the memory controller. A probe result queue is connected to the address cache for storing data cache line addresses and hit/miss information. A multiplexer connected to the data cache, the data queue, and the probe result queue selects output data from the data cache or the data queue depending on the hit/miss information.

10 Claims, 5 Drawing Sheets

| FETCHED TEXEL NUMBER | PROBE REQUEST ADDRESS | HIT OR MISS | CACHE LINE ADDRESS |
|---|---|---|---|
| T0 | A0 | MISS | 0 |
| T1 | B0 | MISS | 1 |
| T2 | C0 | MISS | 2 |
| T3 | C0 | HIT | 2 |
| T4 | F0 | MISS | 3 |
| T5 | F0 | HIT | 3 |
| T6 | B0 | HIT | 1 |
| T7 | D0 | MISS | 4 |
| T8 | G0 | MISS | 5 |
| T9 | E0 | MISS | 6 |
| T10 | I0 | MISS | 7 |
| T11 | I0 | HIT | 7 |
| T12 | J0 | MISS | 0 |
| T13 | I0 | HIT | 7 |
| T14 | H0 | MISS | 1 |
| T15 | G0 | HIT | 5 |

FIG. 5

APPARATUS AND METHOD FOR PROVIDING NON-BLOCKING PIPELINED CACHE

FIELD OF THE INVENTION

This invention relates generally to computer system memories, and more particularly to cached memories used in graphic computer systems.

BACKGROUND OF THE INVENTION

In a graphic computer system, texture mapping (i.e., "texturing") can increase the realism of three-dimensional (3D) images generated by the system. Example textures can represent wood grains, bricks, carpets, stone walls, grass, and the like. Textures provide a more realistic rendering of the surfaces of image objects. Texturing is performed using an array of texture elements (texels) stored as a texture map in computer memories. The texture map can be synthesized, or obtained from a scanned image.

A low resolution texture map may include 64×64 texels, while a high resolution map may have 4096×4096 texels. Typically, texels are stored as words of data, the address of each word indicates a particular coordinate of the texture map. The data can represent color (RBG), and, perhaps, transparency information.

To display a graphic image including objects having textured surfaces, graphic software and hardware converts the surfaces to an array of screen coordinates associated with displayable picture elements (pixels). The pixel coordinate are used to locate corresponding texels of the texel map. The color and transparency values of the corresponding texels are merged with pixel data to determine the color and transparency final values of the displayed pixels. Texel coordinates interior to surfaces can be obtained by interpolating texel coordinates supplied at the vertices of objects.

In low quality texture mapping called "point-sampling," only one texel is used for each of the pixels of the image. As a result, point-sampled textured images tend to have annoying aliasing artifacts in the way of discernable discontinuities in their textured surfaces. This is particularly true if the surface to be textured is highly distorted, for example, a surface of a 3D image which extends into the distance.

For high quality texturing, such as tri-linear texture mapping, multiple texel maps may be used, e.g., "Multem In Parvo" (many in place) maps, or Mipmaps. For example, a first high resolution Mipmap of a texture has 1024×1024 texels, the next lesser resolution Mipmap has 512×512 texels, the next 256×256 texels, and so forth, all the way down to a 1×1 low resolution single texel Mipmap for a total of 11 Mipmaps representing a specific texture. From these multiple maps, textures for distorted surfaces can smoothly be interpolated, even if zooming is used to increase or decrease the size of the object to give a sense of three-dimensions.

High quality texture mapping may require the mapping of eight or sixteen texels to a single pixel. This means that for every pixel the system must access texel data at eight or sixteen memory addresses. Clearly, texturing can consume a large amount of bandwidth of memory systems.

It would be desirable to reduce the memory bandwidth requirements of texture mapping. This might allow the use of fewer memory chips devoted to textures, the use of less expensive general-purpose low-speed dynamic random access memories (DRAM) to store textures, and to store textures in the same memory as used for other data during image generation.

Some prior art texture mapping devices store texture maps in dedicated high-speed static random access memories (SRAM). Each read request for texel data makes an access to the SRAM, even if successive data are read from the identical address. SRAMs specifically designed for texture mapping tend to be expensive, highly integrated into the graphic hardware, and of limited functionality.

In modern DRAM, the sense amplifiers can be used to "cache" data. Caching can take advantage of spatial and temporal localities of data. For example, if a sequence of texel addresses are all in the same DRAM page, then the data can be accessed directly from the sense amplifiers.

With DRAM, the memory bandwidth for fetches from the same memory page can approach that of SRAM. However, if there is a "miss" on an address of a current page, then another page needs to be accessed. Switching between DRAM pages may require several processor cycles while the data of the next page are fetched and latched into the sense amplifiers. This increases access latencies. Such latencies can be hidden by using long pipelines in the access path if the average bandwidth of the memory system is sufficient to handle page fetches.

Adding a true cache to the memory system may reduce bandwidth requirements when there are good spatial and temporal localities in the data. However, implementing a cache memory for graphic devices is difficult. If the cache is configured as a traditional blocking cache, then a miss will "stall" further accesses, since the miss must completely be serviced before a next access request can be accepted. This is due to the fact that the fetched data must be latched somewhere before further requests can proceed. If there are a larger number of misses, then stalls will cause the memory system to deliver less bandwidth for texel fetches than a pipelined non-cached memory system.

If miss-servicing bookkeeping logic is included, then the cache can be made non-blocking. However, a non-blocking cache can be a hindrance if it cannot track as many misses as there are stages in the pipeline, e.g., from the read request to the data becoming available.

The latency and cache size problems become even worse when the memories not only store texel and pixel data but also other information. If the memories are configured, as desired, from general purpose low-cost DRAM, then many different types of graphic information can be stored there. However, in this case, access requests to the various buffers should be batched to avoided page "thrashing." Batched accesses may delay requests for texel data to further increase latencies and the number of misses that need to be tracked.

A direct-mapped cache could be used. However, it should be quite large so that addresses are adequately distributed throughout the cache. If the cache is tens of lines, then some data may remain unused for extended periods of time wasting cache, while other data experience frequent conflicts degrading performance. Larger caches also increase cost.

A non-blocking fully associative content addressable memory (CAM), which uses the full address of the data as a tag, may be more appropriate for texture mapping. But even a fully associative cache needs to be a reasonable size, and latencies on a miss can still cause large delays between the time the read request is issued, and the time the data become available. The peculiarities of texture mapping increases the likelihood of cache misses. In a worse case, each texel is used exactly once, and therefore, each access will cause a miss, so the cache does not provided any benefit at all.

Therefore, it is desired to provide a cache for graphic systems which can decrease the bandwidth required by texel fetches without the disadvantages of traditional caches.

SUMMARY OF THE INVENTION

Provided is a non-blocking pipelined cache which can be used in a graphic processor for accessing texel data. The non-blocking pipelined cache maintains texel addresses and data in address and data caches connected to each other by first-in-first-out queues. The addresses and data are maintained in a spatial and temporal separate manner.

The address cache includes a plurality of lines. Each line can store a memory address specified in read requests. Associated with each line is a line address. A first queue has an input connected to the address cache and an output connected to a memory controller. The first queue stores missed memory addresses due to read request misses. The missed memory addresses are forwarded to the memory controller. A second queue connected to the memory controller receives data stored at the missed memory addresses.

A third queue connected to the address cache, for each read request, stores a line address and hit/miss information. The hit/miss information indicates whether or not a particular requested address is stored in the address queue.

A data cache is connected to the output of the second and third queues. The data cache stores the data at the missed memory addresses received from the second queue. A multiplexer selects data to output from the data cache or the second queue depending on the hit/miss information stored in the third queue.

BRIEF DESCRIPTION OF THE DRAWINGS

FIG. 5 is a table of hit/miss information associated with an eight-line cache.

DETAILED DESCRIPTION OF PREFERRED EMBODIMENTS

Figure 1:
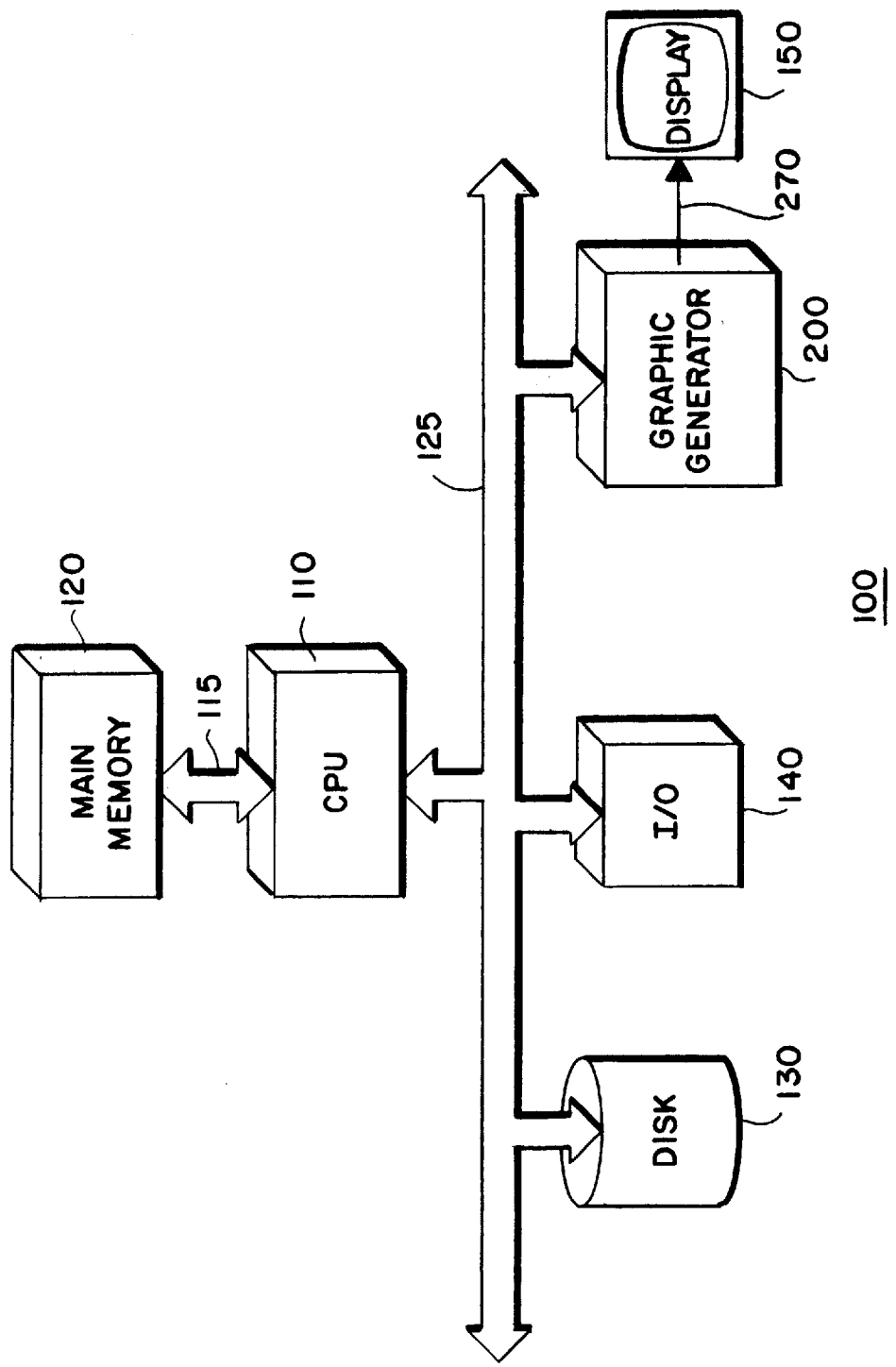
FIG. 1 is a block diagram of a graphic display system which uses a non-blocking pipelined cache according to the invention.

Now with reference to FIG. 1, a preferred embodiment of a non-blocking pipelined cached according to the invention is described in detail. A graphic display system 100 includes a general purpose central processing unit (CPU) 110 connected to a main memory 120 by a memory bus 115. The CPU 110 is also connected to general purpose bus 125, for example, a PCI bus. The bus 125 can be connected to a disk subsystem 130, an input/output (I/O) subsystem 140, and a graphic generator 200. The graphic generator 200 is connected to a graphic display device 150 by line 270. The system 100 can be configured as a graphic workstation.

The CPU 110 can include one or more general purpose processor chips, for example, ALPHA processors from Digital Equipment Corporation, Maynard, Mass. The main memory 120 is for storing machine executable instructions and data while the system 100 is operating. The disk 130 persistently stores the instructions and data in files. The instructions and data can be obtained via the I/O subsystem 140. The I/O system can also connect to I/O devices (not shown) such as a keyboard, mouse, or joy-stick to control the operation of the system 100. The buses 115 and 125 carry address, data, control, and timing signals.

During operation of the system 100, the instructions of software programs are executed by the CPU 110. The programs are designed to generate graphic images on the display device 150. The data for the images, and instructions on how to render the images are transferred to the graphic generator 200 via the buses 115 and 125. The generator 200 converts the digital data to analog signals which can drive the display device 150. More specifically, the graphic generator 200 renders three-dimensional images at high-speed.

Figure 2:
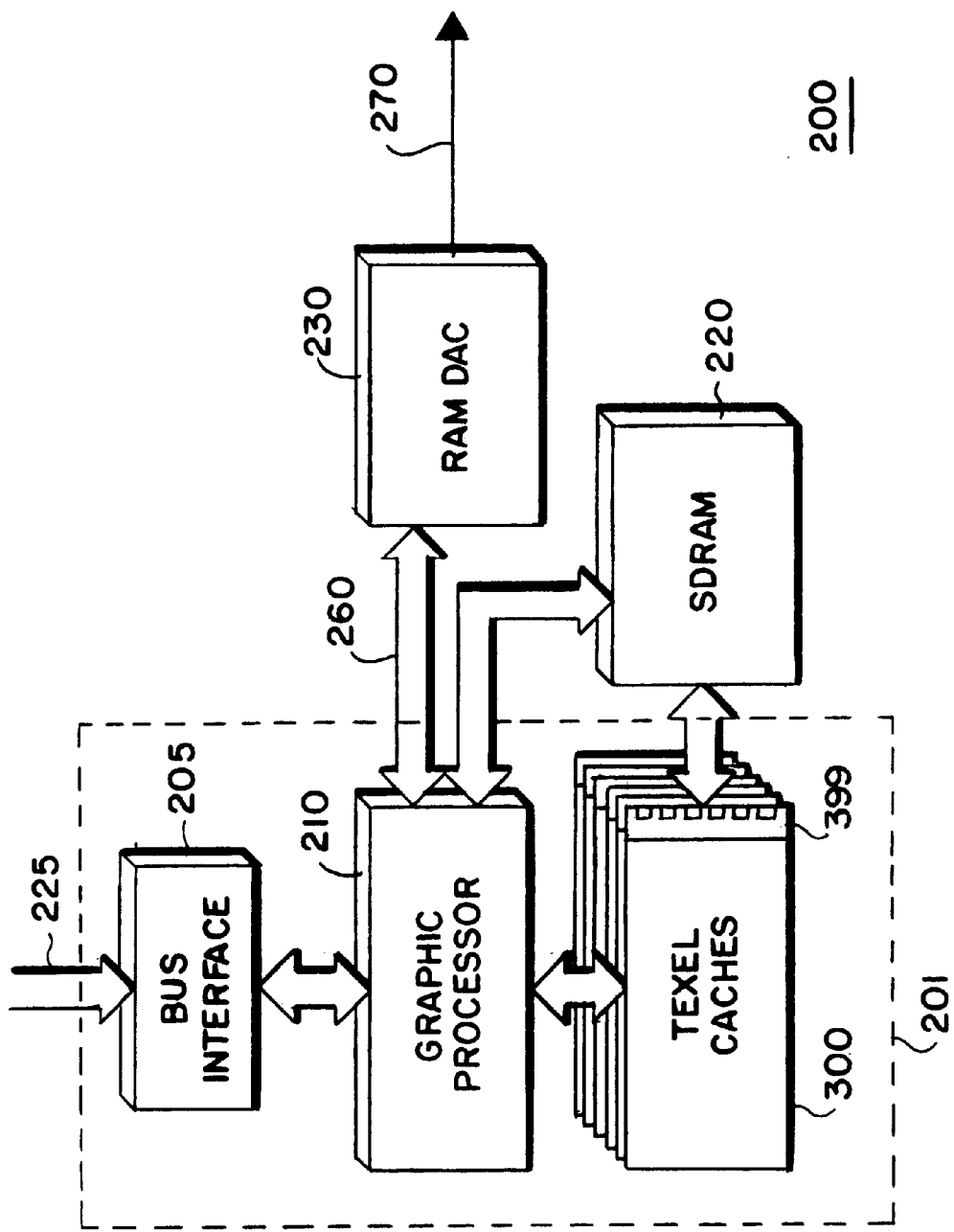
FIG. 2 is a block diagram of a graphic generator of the system of FIG. 1.

As shown in FIG. 2, the generator 200 includes a bus interface 205 for connecting to the bus 125 of FIG. 1. A specific purpose graphic processor 210 is connected to a random access memory/digital-to-analog convertor (RAMDAC) 230. The RAMDAC 230 receives digital graphic data on line 260, and produces analog video signals on line 270.

The graphic processor 210 is also connected to a synchronous dynamic access memory (SDRAM) 220, and texel caches 300. The SDRAM 220 stores graphic data in maps and buffers. The buffers can include front, back, color, Z, stencil, overlay, and format buffers. The maps can store texture data (texels). Preferably, the elements 205, 210, and 300 are arranged on a single semiconductor chip 201.

During operation, the generator 200 receives graphic data and instructions from the CPU 110 of FIG. 1. The data can be stored in the SDRAM 220 as maps and buffers. The data of the buffers and maps are combined by the processor 210 to produce graphic data on line 260. Because of the large numbers of texels accessed, and in order to improve system performance, the texel caches 300 are used to cache texel data.

In one embodiment, there is one memory controller 399 for each texel cache 300. If eight texel caches 300 are used, then there will be eight memory controllers 399. In contrast with traditional caches, here the number of lines in each cache is a small integer number, for example, two, three, four, eight, or twelve.

In order to deal with small sized caches 300 and long memory latencies, the caches 300 are configured to separate data and their address tags in space and time using a pipeline. This allows the caches 300 to be non-blocking and have more outstanding "missed" requests than there are lines in the caches 300. This not only improves performance, but also simplifies the design.

Figure 3:
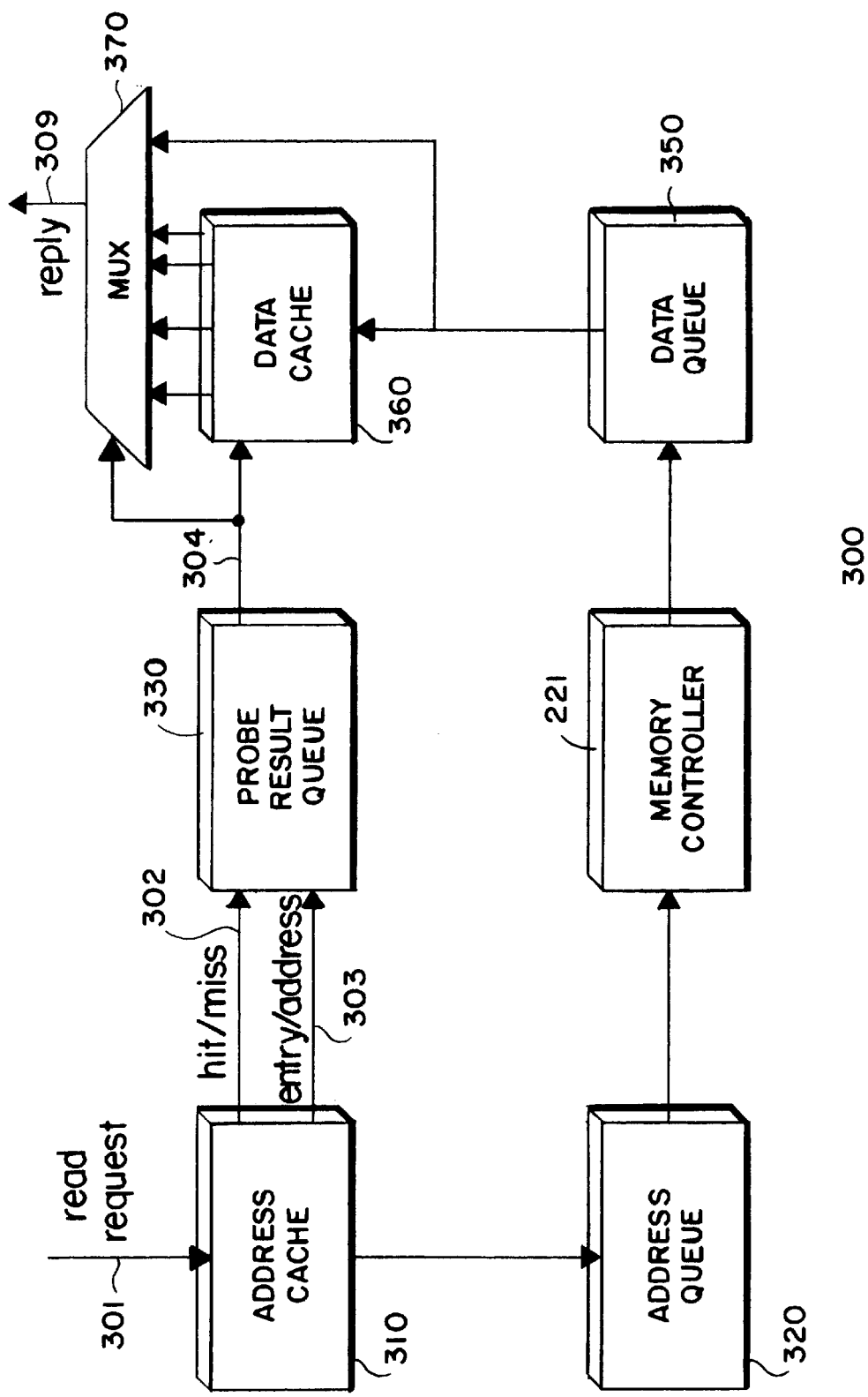
FIG. 3 is a block diagram of a non-blocking pipeline cache according to a preferred embodiment of the invention.

FIG. 3 show one non-blocking pipelined texel cache 300 in a greater level of detail. The cache 300 includes an address cache 310. The address cache 310 is a fully associative content addressable memory (CAM) which uses twenty-two bits as address tags. In the preferred embodiment, the number of lines in the address cache 310 is small, for example eight. The address cache 310 also maintains least recently written information in a wraparound counter. The least recently written line becomes the next "victim" in case of a miss. The cache lines have associated line addresses, for example, 0 to 7.

The address cache 310 is coupled to an input end (tail) of an address queue 320. The address queue 320 is a 22 bit wide first-in-first-out (FIFO) buffer. The address queue 320 stores addresses (tags) of the most recently missed accesses.

The output end (head) of the address queue 320 is coupled to the input of one of the memory controllers 399 of FIG. 2. The output from the memory controller 399 is connected to an input end (tail) of a data queue 350. The data queue is a 32 bit wide FIFO.

The address cache 310 is also connected to an input end of a probe result queue 330 by lines 302 and 303. The probe result queue 330 is an N+1 bits wide FIFO, where N bits on line 303 are used to indicate a particular line of the address cache 310, and one bit on line 302 is used to indicate hit/miss information.

A data cache 360 and a multiplexer (MUX) 370 both receive input from the head of the probe result queue 330, and the head of the data queue 350. The data cache 360 can be implemented as SRAM, an interconnected register file, or a set of latches. The MUX 370 is 32 bits wide with multiple inputs and one output on line 309. The output of the MUX is selected by the information supplied to the probe result queue 330 via lines 302 and 303 which eventually come out on line 304. In other words, the selection is time-delayed dependent on the signals on lines 302 and 303, the delay being the time for the information to make it to the head of the queue 330. This means that the selection is immediately based on the information in the head entry of the probe result queue.

During operation, the cache 300 receives "probe" addresses associated with read access requests on line 301. The probe addresses can be used to probe all lines of the address cache 310 simultaneously. If there is a hit, the hit/miss information on line 302 is set to a logical one (high), otherwise in case of a miss, the line 302 is set to a logical zero.

In case of a hit, the hit line address (N-bits) is expressed on line 303, otherwise, a victim line address is expressed. This means that one N+1 bit entry (line address plus hit/miss information) is placed at the tail of the probe result queue 330 for each cache access, hit or miss.

In case of a miss, the probe address is placed on the address queue 320. The address queue 320 drives request made to the high latency SDRAM 220 via the controller 399. Responses from the controller 399 are data at missed addresses. The data are placed in the data queue 350.

The data cache 360 is accessed using the entries of the probe result queue 330. If the head of the probe result queue indicates a hit, the N bits on line 304 are used as a cache line address to read the requested texel data from the data cache 360. A hit also causes the MUX 370 to select, as its output on line 309, data from the data cache 360 at the selected data cache address.

If the probe entry indicates a miss, then the data of the next FIFO entry of the data queue 350 are stored in the data cache 360 at the cache line address specified in the N bits of the probe queue entry on line 304. In this case, the MUX 370 selects, as output on line 309, the data from queue 350. In either the hit or miss case, data are presented on line 309 in the identical order as the data were requested.

Other means for selecting can also be used. For example, the selection can be performed by "transparent" latches that "load" missed data from the data queue 330 into the data cache 360 at the beginning of a cycle, and would allow data from the data queue to "flow" through the latch during the cycle.

If there is a hit on the address cache 310, or the address queue 320 is not full, then new read requests can be accepted. If there is a miss in the address cache 310 and the address queue 320 is full, then the read request must be stalled until space becomes available in the address queue 320. If there is a hit in the data cache 360, or the data queue 350 is not empty, then the reply data are available. If there is a miss in the data cache 360, and the data queue 350 is empty, then the reply must be stalled until data become available in the data queue 350.

Figure 4:
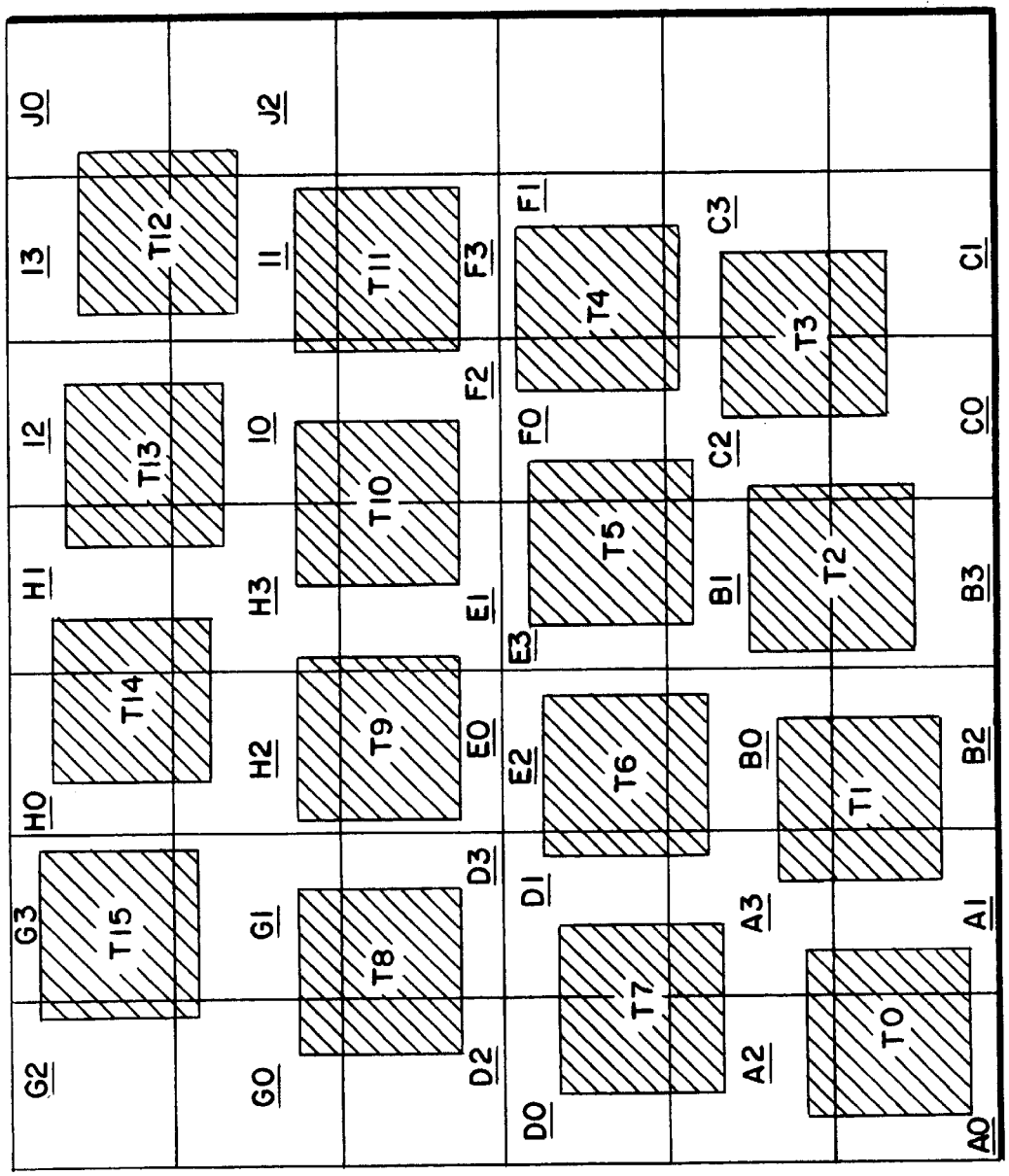
FIG. 4 is a diagram of texel fetches from a texture map.

The "shaded" 2×2 pixel squares T0, ..., T15 in FIG. 4 show an example of how sixteen texture-mapped pixels are mapped onto a texture Mipmap, and hence generate texel fetch requests. Each shaded square requires fetching the four texels that the shaded pixel square overlaps.

The A–J of the labels A0–J3 indicate different 22 bit addresses, and the numbers 0, 1, 2, and 3 represent the different memory controllers 399, and therefore, different caches where the texel data are to be cached.

If there are eight lines in each cache 300, then the hit to miss ratio will be good. Even a two line cache will give good performance when the texels are fetched in an appropriate manner.

A table 500 of FIG. 5 shows the dynamic hit and miss information 520 for memory controller 0 texel fetch requests. In FIG. 5, column 510 shows the texel fetch request number, column 515 the probe request addresses, column 520 the hit or miss indication, and column 530 the cache line address, assuming an eight line cache.

The utility of the non-blocking pipelined cache has been described for texel caching. However, the same design can also be used to tile a small source rectangle onto a larger destination rectangle in other graphic applications.

The foregoing description has been directed to specific embodiments of this invention. It will be apparent, however, that variations and modifications may be made to the described embodiments, with the attainment of all or some of the advantages. Therefore, it is the object of the appended claims to cover all such variations and modifications as come within the spirit and scope of the invention.

We claim:

1. An apparatus suitable for use in caching data and providing a reply output in response to read requests, said apparatus comprising:

an address cache comprising a plurality of lines for receiving the read requests and for storing memory addresses specified in the read requests, said lines having associated line addresses;

a probe result queue connected to said address cache, said probe result queue for storing said line address information and for storing hit/miss information corresponding to the read requests;

an address queue connected to said address cache, said address queue for storing missed memory addresses corresponding to read request misses received from said address cache;

a data queue for storing data corresponding to said missed memory addresses;

memory control means disposed between said address queue and said data queue, said memory control means for receiving said missed memory addresses from said address queue and for sending said missed memory addresses to said data queue;

a data cache connected to both said probe result queue and said data queue, said data cache for storing the data corresponding to said missed memory addresses received from said data queue; and means for selecting the reply output from said data cache or from said data queue depending on the line address information stored in a head entry of said probe result queue, to provide a non-blocking pipelined cache, the reply output comprising data corresponding to said miss address if miss information is present.

2. The apparatus as in claim 1 wherein said address cache comprises a fully associative content addressable memory.

3. The apparatus as in claim 1 wherein said memory addresses are stored as tags.

4. The apparatus as in claim 1 wherein said probe result queue further comprises:

a plurality of entries, each said entry comprising N+1 bits, where N bits indicate a particular line address and one bit comprises said hit/miss information.

5. The apparatus as in claim 1 wherein said data cache comprises an interconnected register file.

6. The apparatus as in claim 1 wherein said stored data comprise texel data.

7. The apparatus as in claim 1 further comprising:

a synchronous dynamic access memory connected to said memory control means, for storing the data.

8. The apparatus of claim 1 wherein the data at said missed addresses is responded to in the order of the misses.

9. The apparatus of claim 1 wherein said plurality of lines are maintained in a least recently written order.

10. A method suitable for caching data and providing a reply output, said method comprising the steps of:

storing memory addresses specified in read requests in an address cache comprising a plurality of lines, the lines having associated line addresses;

queueing the line addresses in a probe result queue connected to said address cache;

queuing missed memory addresses due to read request misses in an address queue connected to said address cache;

forwarding the missed memory addresses to a memory controller;

queuing data corresponding to the missed memory addresses received from the memory controller to a data queue connected to said memory controller;

storing the data corresponding to the missed memory addresses received from said data queue in a data cache connected to said data queue and said probe result queue; and selecting the reply output from said data cache or from said data queue depending on the information stored in a head entry of said probe result queue.

* * * * *